United States Patent [19]
Hsu et al.

[11] 3,856,852
[45] Dec. 24, 1974

[54] 15(S), 18-DIHYDROXY-9-OXO-5-CIS-13-TRANS-PROSTADIENOIC ACID

[75] Inventors: Charles F. Hsu, Skokie; James Jiu; Seth Setsuo Mizuba, both of Morton Grove, all of Ill.

[73] Assignee: G. D. Searle & Co., Chicago, Ill.

[22] Filed: Sept. 17, 1973

[21] Appl. No.: 397,899

Related U.S. Application Data

[63] Continuation-in-part of Ser. No. 295,209, Oct. 5, 1972, Pat. No. 3,788,947.

[52] U.S. Cl.......... 260/514 D, 260/468 D, 115/307, 115/51 R, 424/317
[51] Int. Cl............................................. C07c 61/36

[58] Field of Search...... 260/514 D, 514 CA, 468 D

[56] References Cited
UNITED STATES PATENTS
3,767,693   6/1972   Samuelsson.................... 260/468

Primary Examiner—Robert Gerstl
Attorney, Agent, or Firm—John J. McDonnell

[57] ABSTRACT

15(S),18-Dihydroxy-9-oxo-5-cis-13-trans prostadienoic acid is formed from 15(S)-hydroxy-9-oxo-5-cis-10,13-trans-prostatrienoic acid ($PGA_2$) by the fermentative action of Cunninghamella blakesleeana (ATCC 9245). This compound is a potent anti-ulcero=genic agent.

1 Claim, No Drawings

15(S), 18-DIHYDROXY-9-OXO-5-CIS-13-TRANS-PROSTADIENOIC ACID

This is a continuation-in-part of our copending application Ser. No. 295,209 filed Oct. 5, 1972 now U.S. Pat. No. 3,788,947.

15(S),18-Dihydroxy-9-oxo-5-cis-13-trans prostadienoic acid is formed from 15(S)-hydroxy-9-oxo-5-cis-10,13-trans-prostatrienoic acid (PGA$_2$) by the fermentative action of fungus *Cunninghamella blakesleeana* (ATCC 9245)* as shown in scheme I.

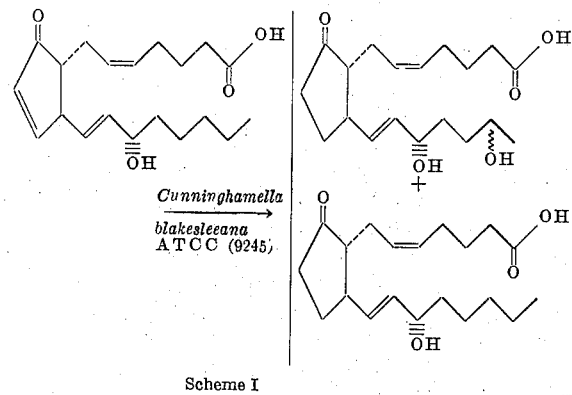

Scheme I

*ATCC cultures are permanently available to the public at American Type Culture Collection, 12301 Parklawn Dr., Rockville, Md. 20852. 15(S)-Hydroxy-9-oxo-5-cis-13-trans-prostadienoic acid which is concommitantly formed with 15(S),18-dihydroxy-9-oxo-5-cis-13-trans prostadienoic acid is separated from the latter by silica gel chromatography. The former compound represents the closest prior art. The 18-hydroxyl function present in the compound of this invention is the novel structural feature which distinguishes the present compound from the prior art.

The compound of this invention is a potent anti-ulcerogenic agent.

The anti-ulcerogenic utility of the instant compounds is evident from the results of a standardized test for their capacity to inhibit the ulceration reported by Shay et al., *Gasteroenterology*, 5, 43 (1945), to occur in rats subjected to fasting and pyloric ligation. In this test, male Charles River rats weighing 200–250 gm. and fasted 72 hours prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hours later, the stomachs of surviving animals are excised and examined under 5X magnification. The number of ulcers occurring in the non-secretory portion of each stomach is counted in 4 groups according to size (< 2 mm., 2–4 mm., 4–8 mm., and > 8 mm.); and each rat receives a score, $z$, which is a weighted average of the logarithms of the ulcer counts in the several size groups determined by a formula found approximately optimal by discriminant function analysis to be $z = 20.00 \log(N_1 + 1) + 0.22 \log(N_2 + 1) + 46.76 \log(N_3 + 1) + 6.11 \log(N_4 + 1)$ where $N_1 \ldots N_4$ are the observed ulcer counts of the increasing size groups. Since long-term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P < 0.05$) and a compound producing such a decrease is considered antiulcerogenic.

The anti-ADH activity of the instant compounds is assesed by the ability of these compounds to reverse oliguria induced by exogenous ADH.

Male Badger rats (Badger Research Corp., Madison, Wisconsin) weighing 150–175 g. were maintained at 70°–73°F. During the first week the animals were conditioned once to (a) bladder palpation, (b) gastric intubation with a French No. 8 catheter followed by tap water (5 ml./100 g.) and (c) 0.5 ml. of 0.9% NaCl, subcutaneous. On the 7th or 8th day after arrival the first experiment (week I) was performed: 18 hours prior to the test the rats were deprived of food, but allowed water ad libitum. The following day the animals (ca. 180 g./rat, range 160–200 g.) were placed in groups of 4 with no more than a 2% variation in group mean weights about the grand mean. At 0 time following bladder palpation the animals were (a) loaded orally with 0.21% NaCl (5 ml./100 g.) containing 5% ethanol (v/v) and 5% propylene glycol (v/v), together with dissolved or suspended test compound, and (b) 1 milliunit (mU) of Pitressin (Parke, Davis & Co.,) per 100 g. in 0.2 ml. of 0.9% NaCl, subcutaneous. Sixty minutes later the animals were palpated, urine volume measured, and a second gavage (5 ml./100 g. of 2.5% ethanol in 0.20% NaCl) and a repeated dose of ADH administered. After 2 hours the test was terminated by palpation to insure complete recovery of a pooled urine sample. Urine volume and Na, K excretion were reported in ml./100 g./2 hours and uEq/100 g./2 hours, respectively. The animals were regrouped and retested 1 week later (week II, ca. 200 g./rat, range 170–210 g.). In most experiments 2 groups (8 rats) were tested at each dosage level.

The appropriate volume metameter for statistical evaluations of response was taken to be log volume. On the log volume scale, 50% reversal of the response to 1 mU ADH/100 g. was the midpoint between 1 mU and control log volume responses. (This point is equivalent to the geometric mean of the two extreme volume responses.) For a test compound, ED$_{50}$ was defined as the dose necessary to produce 50% reversal, as defined above, when given together with 1 mU ADH/100 g. The 95% confidence limits of the ED$_{50}$ were calculated according to Fieller's theorem on the fiducial limits of a ratio.

Fermentation is ordinarily carried out in the medium wherein the organism is cultured. However, it is likewise possible to separate the fungal cells from the culture medium by centrifugation or other means and use the resultant cellular matter to implement the fermentation. Moreover, the cells can be ruptured ultrasonically or otherwise to facilitate access to enzymes present, which can be isolated by filtration or extracted with a solvent such as acetone or water and substituted for the organism or cells thereof.

A nutrient medium is required for culture of the organism, which is to say one containing assimiable nitrogen and carbon; and an adequate supply of sterile air should be maintained therein, for example, by exposing a large surface of the medium to the air or preferably passing it through the medium in quantities sufficient to support submerged growth.

Suitable nitrogen sources are thus normally employed for the purpose, including soy bean meal, cornsteep liquor, meat extract, protein (optionally digested), peptone, yeast extract, distillers' solubles, casein hydrolysate, nitrate, cottonseed meal and/or ammonium compounds. All of the foregoing materials excepting sometimes the last two serve also as carbon sources. Other carbon-containing substances satisfactory and conventionally used as nutrients are the carbohydrates, for example, glycerol, glucose, fructose, sucrose, lactose, maltose, inositol, dextrin, starch and whey, among which inositol is additionally useful because of its unusual capacity to stimulate growth.

Phosphate, magnesium, and/or ferrous ions likewise may be incorporated in the culture medium as growth-promoting factors if desired; buffers may be added to assure that growth is initiated at a suitable pH; and wetting agents may be employed to improve contact between the prostaglandin and the fermenting agent. An anti-foaming agent is usually beneficial. Where isolated cells or enzymes are used to induce fermentation rather than the intact and growing organism, nutrients need not, or course, be present; but in either event the medium is customarily preponderantly aqueous.

A preferred embodiment of the present invention is conducted in a medium consisting of 150 parts of cottonseed meal, 65 parts by volume of cornsteep liquor, 50 parts of Dextrose, 0.3 parts of volume of 6N hydrochloric acid, and 1000 parts by volume of water is sterilized by heating for 10 min. at 121°, whereupon it is cooled to 23° ± 1° and then is inoculated with 10 parts of a fluid culture of *Cunninghamella blakesleeana* (ATCC 9245). The inoculating fluid is prepared by incubating a seed culture for 72 hours in 100 parts by volume of the above mentioned sterilized medium from spores originating on an agar slant.

The inoculated medium is incubated for 36 hours and then 0.1 parts of 15(S)-hydroxy-9-oxo-5-cis-10,13-trans-prostatrienoic acid (PGA$_2$) is added. Incubation in the presence of the PGA$_2$ substrate is continued for 24 hours, at which time the mixture is extracted with dichloromethane. The dichloromethane layer is separated and the solvent is removed from this separated layer by evaporation in vacuo.

Chromatography on silica gel provides 15(S)-hydroxy-9-oxo-5-cis-13-trans-prostadienoic acid and 15(S),18-dihydroxy-9-oxo-5-cis-13-trans-prostadienoic acid.

The following example is presented to further illustrate the present invention. It should not be construed as limiting it either in scope or in spirit. In this example quantities are indicated in parts by weight unless parts by volume are specified, and temperatures are indicated in degrees Centigrade (°C.).

EXAMPLE 1

A medium consisting of 150 parts of cottonseed meal, 65 parts by volume of cornsteep liquor, 50 parts of Dextrose, 0.3 parts by volume of 6N hydrochloric acid, and 1000 parts by volume of water is sterilized by heating for 1 hour at 121°, whereupon it is cooled to 23° ± 1° and then is inoculated with 10 parts of a fluid culture of *Cunninghamella blakesleeana* (ATCC 9245). The inoculating fluid is prepared by incubating a seed culture for 72 hours in 100 parts by volume of the above mentioned sterilized medium from spores and mycelium originating on an agar slant.

The inoculated medium is incubated fo 36 hours and then 0.1 parts of 15(S)-hydroxy-9-oxo-5-cis-10,13-trans-prostatrienoic acid (PGA$_2$) is added. Incubation in the presence of the PGA$_2$ substrate is continued for 24 hours, at which time the mixture is extracted with dichloromethane. The dichloromethane layer is separated and the solvent is removed from this separated layer by evaporation in vacuo. The crude extract is taken up in 850 parts by volume of phosphate buffer solution of pH 8 and this solution is extracted with hexane. The aqueous layer is made acidic with 6N hydrochloric acid to pH 2.5 and extracted with dichloromethane. The dichloromethane is removed by evaporation in vacuo. The remaining material is taken up in ethyl acetate and that which is insoluble in ethyl acetate is removed by filtration. The ethyl acetate is evaporated and the remaining material is taken up in a solution consisting of 97 parts by volume of benzene, 2 parts by volume of dioxane, and 1 part by volume of acetic acid. This solution is placed on a chromatographic column packed with silica gel and 15(S)-hydroxy-9-oxo-5-cis-13-trans-prostadienoic acid is eluted in a solvent system consisting of 87 parts by volume of benzene, 10 parts by volume of dioxane, and 3 parts by volume of acetic acid and 15(S),18-dihydroxy-9-oxo-5-cis-13-transprostadienoic acid is eluted in a solvent system consisting of 74 parts by volume of benzene, 18 parts by volume of dioxane, and 8 parts by volume of acetic acid.

What is claimed is:
1. 15(S),18-Dihydroxy-9-oxo-5-cis-13-transprostadienoic acid.

* * * * *